UNITED STATES PATENT OFFICE.

ADOLF SCHUFTAN, OF ZURICH, SWITZERLAND, ASSIGNOR TO THE FARBWERKE, VORMALS MEISTER, LUCIUS & BRÜNING, OF HÖCHST-ON-THE-MAIN, GERMANY.

IODOFORM SUBSTITUTE.

SPECIFICATION forming part of Letters Patent No. 575,175, dated January 12, 1897.

Application filed November 2, 1895. Serial No. 567,725. (Specimens.)

*To all whom it may concern:*

Be it known that I, ADOLF SCHUFTAN, a citizen of the Empire of Germany, residing at Zurich, Switzerland, have invented certain new and useful Improvements in the Manufacture of a Compound Out of Methylenebisphenyldimethylpyrazolon and Bromin, of which the following is a specification.

This invention relates to an improved preparation for the treatment of wounds, to be used as a substitute for iodoform, and is obtained from methylenebisphenyldimethylpyrazolon and bromin.

I have discovered that the condensation product of formic aldehyde and phenyldimethylpyrazolon, namely, methylenebisphenyldimethylpyrazolon, combines with bromin, forming a new compound.

In order to manufacture this new product, I dissolve methylenebisphenyldimethylpyrazolon in dilute hydrochloric acid and run in a solution of bromin in water until no further precipitation takes place.

I illustrate my method by the following example: Four kilograms of methylenebisphenyldimethylpyrazolon are dissolved in forty liters of water and eight kilograms of hydrochloric acid of specific gravity 1.09, and, while stirring continuously, treated with a solution of bromin in water. A precipitate is first formed, which redissolves in the agitated solution until a certain quantity of bromin-water has been run into it. On further addition of bromin-water the new compound is precipitated in yellow flakes. Bromin-water is added as long as a further precipitate is formed. The substance is then filtered off, washed with water, and dried.

The new compound is a yellow light powder. It becomes compact at about 110° and decomposes at 127°. By dissolving it in alcohol and adding water until the solution becomes turbid the substance is obtained in yellowish needles, which decompose at 140°.

The compound is soluble in alcohol, ether, acetone, glacial acetic acid, chloroform, and benzene, insoluble in water and ligroin. It has a faint smell resembling iodoform.

My improved compound is applied to the wounds in the same manner as iodoform and in doses which depend upon the size of the wounds.

Having thus described my invention, I claim as new and desire to secure by Letters Patent—

1. The process of producing a compound from methylenebisphenyldimethylpyrazolon and bromin which consists in dissolving the former in hydrochloric acid and then adding bromin-water to the solution, substantially as set forth.

2. As a new article of manufacture, the compound obtained from methylenebisphenyldimethylpyrazolon and bromin, being a yellow light powder, soluble in alcohol, ether, acetone, glacial acetic acid, chloroform or benzene, insoluble in water or ligroin, and having a faint smell resembling iodoform, substantially as set forth.

In testimony that I claim the foregoing as my invention I have signed my name in presence of two subscribing witnesses.

ADOLF SCHUFTAN.

Witnesses:
JOSEF RAWTZER,
OSCAR GOLDSCHMIDT.